United States Patent
Simonetti et al.

(10) Patent No.: US 7,517,581 B2
(45) Date of Patent: Apr. 14, 2009

(54) SEMIPERMEABLE HYDROPHILIC MEMBRANE

(75) Inventors: John A. Simonetti, Thousand Oaks, CA (US); Irina Vinarov, Moorpark, CA (US)

(73) Assignee: Parker-Hannifin Corporation, Cleveland, OH (US)

(*) Notice: Subject to any disclaimer, the term of this patent is extended or adjusted under 35 U.S.C. 154(b) by 426 days.

(21) Appl. No.: 10/947,280

(22) Filed: Sep. 23, 2004

(65) Prior Publication Data
US 2005/0164025 A1 Jul. 28, 2005

Related U.S. Application Data

(60) Provisional application No. 60/506,654, filed on Sep. 26, 2003.

(51) Int. Cl.
*B32B 3/26* (2006.01)
*B32B 3/00* (2006.01)
*B32B 27/00* (2006.01)
*B32B 29/00* (2006.01)

(52) U.S. Cl. .................. 428/304.4; 428/316.6; 428/421; 428/532

(58) Field of Classification Search .............. 428/304.4, 428/316.6, 421, 532
See application file for complete search history.

(56) References Cited

U.S. PATENT DOCUMENTS

| | | | |
|---|---|---|---|
| 3,781,265 A | 12/1973 | Dohany | |
| 4,038,228 A | 7/1977 | Taylor | |
| 4,048,410 A | 9/1977 | Taylor et al. | |
| 4,051,306 A | 9/1977 | Tobias et al. | |
| 4,056,499 A | 11/1977 | Taylor | |
| 4,080,357 A | 3/1978 | Gergen et al. | |
| 4,107,130 A | 8/1978 | Gergen et al. | |
| 4,107,131 A | 8/1978 | Gergen et al. | |
| 4,111,894 A | 9/1978 | Gergen et al. | |
| 4,119,607 A | 10/1978 | Gergen et al. | |
| 4,126,600 A | 11/1978 | Gergen et al. | |
| 4,219,422 A * | 8/1980 | Knothe et al. | 210/137 |
| 4,309,328 A | 1/1982 | Carson et al. | |
| 4,340,479 A | 7/1982 | Pall | |
| 4,413,074 A | 11/1983 | Wrasidlo et al. | |
| 4,604,208 A | 8/1986 | Chu et al. | |
| 4,629,563 A | 12/1986 | Wrasidlo | |

(Continued)

FOREIGN PATENT DOCUMENTS

DE    3 729 268 A1    3/1989

(Continued)

OTHER PUBLICATIONS

"Presently Available Membranes for Liquid Separation", Membrane Technology in the Chemical Industry, Edited by S. P. Nunes and K.-V. Peinemann, 2001, pp. 12-33.*

(Continued)

*Primary Examiner*—Victor S Chang
(74) *Attorney, Agent, or Firm*—Christopher H. Hunter

(57) ABSTRACT

A hydrophilic semipermeable membrane can include a porous polymeric structure containing a blend of PVDF and hydroxyalkylcellulose. The membrane may be used for ultrafiltration. A method of making a hydrophilic semipermeable membrane can include providing a blend containing PVDF and hydroxyalkylcellulose, forming the blend into a porous polymeric structure, and purifying the porous polymeric structure.

39 Claims, 7 Drawing Sheets

U.S. PATENT DOCUMENTS

| | | | |
|---|---|---|---|
| 4,663,041 A | 5/1987 | Miyagi et al. | |
| 4,666,607 A | 5/1987 | Josefiak et al. | |
| 4,725,359 A | 2/1988 | Ray | |
| 4,735,717 A * | 4/1988 | Sims | 210/247 |
| 4,774,039 A | 9/1988 | Wrasidlo | |
| 4,774,132 A | 9/1988 | Joffee et al. | |
| 4,810,384 A | 3/1989 | Fabre | |
| 4,888,115 A | 12/1989 | Marinaccio et al. | |
| 4,900,449 A | 2/1990 | Kraus et al. | |
| 4,915,839 A | 4/1990 | Marinaccio et al. | |
| 4,933,081 A | 6/1990 | Sasaki et al. | |
| 4,963,271 A | 10/1990 | Raehse et al. | |
| 5,019,260 A | 5/1991 | Gsell et al. | |
| 5,019,261 A * | 5/1991 | Stengaard | 210/490 |
| 5,037,716 A | 8/1991 | Moffat | |
| 5,091,086 A | 2/1992 | Stengaard | |
| 5,098,569 A | 3/1992 | Stedronsky | |
| 5,104,729 A | 4/1992 | Stedronsky | |
| 5,139,881 A | 8/1992 | Henis et al. | |
| 5,151,193 A | 9/1992 | Grobe et al. | |
| 5,171,445 A | 12/1992 | Zepf | |
| 5,188,734 A | 2/1993 | Zepf | |
| 5,211,827 A | 5/1993 | Peck | |
| 5,277,965 A | 1/1994 | Malhotra | |
| 5,282,971 A | 2/1994 | Degen et al. | |
| 5,283,138 A | 2/1994 | Ferrando | |
| 5,349,003 A | 9/1994 | Kato et al. | |
| 5,468,570 A | 11/1995 | Ferrando | |
| 5,514,461 A | 5/1996 | Meguro et al. | |
| 5,626,805 A | 5/1997 | Meguro et al. | |
| 5,759,727 A | 6/1998 | Malhotra | |
| 5,834,107 A | 11/1998 | Wang et al. | |
| 5,980,508 A | 11/1999 | Cardamone et al. | |
| 5,980,746 A | 11/1999 | Gelman et al. | |
| 5,989,746 A | 11/1999 | Bernard et al. | |
| 6,028,028 A | 2/2000 | Nitta | |
| 6,045,694 A | 4/2000 | Wang et al. | |
| 6,077,408 A | 6/2000 | Miyamoto et al. | |
| 6,110,309 A | 8/2000 | Wang et al. | |
| 6,112,908 A | 9/2000 | Michaels | |
| 6,146,747 A | 11/2000 | Wang et al. | |
| 6,149,952 A | 11/2000 | Horan | |
| 6,210,833 B1 | 4/2001 | Bernard et al. | |
| 6,228,381 B1 | 5/2001 | Suverkrup et al. | |
| 6,274,270 B1 | 8/2001 | Audry et al. | |
| 6,277,483 B1 | 8/2001 | Peinemann et al. | |
| 6,290,733 B1 | 9/2001 | Andrieu et al. | |
| 6,309,655 B1 | 10/2001 | Minnix | |
| 6,319,591 B1 | 11/2001 | Malhotra | |
| 6,348,284 B1 | 2/2002 | Bernard et al. | |
| 6,451,386 B1 | 9/2002 | Simonetti | |
| 6,455,197 B1 | 9/2002 | Bernard et al. | |
| 6,510,949 B1 | 1/2003 | Grauer et al. | |
| 6,565,748 B1 | 5/2003 | Wang et al. | |
| 6,573,004 B1 | 6/2003 | Igarashi et al. | |
| 6,596,167 B2 * | 7/2003 | Ji et al. | 210/500.42 |
| 2002/0108637 A1 | 8/2002 | Simonetti et al. | |
| 2002/0115293 A1 | 8/2002 | Ghodsian | |
| 2002/0176617 A1 | 11/2002 | Simonetti | |
| 2003/0034116 A1 | 2/2003 | Simonetti | |
| 2003/0068369 A1 | 4/2003 | McAllister et al. | |
| 2003/0114568 A1 | 6/2003 | Sato | |
| 2003/0134052 A1 | 7/2003 | Dave | |

FOREIGN PATENT DOCUMENTS

| | | | |
|---|---|---|---|
| DE | 4 142 366 A1 | 6/1993 | |
| EP | 0 256 908 A1 | 2/1988 | |
| EP | 0 257 635 A2 | 3/1988 | |
| EP | 0 320 258 A1 | 6/1989 | |
| EP | 0 360 575 A2 | 3/1990 | |
| EP | 0 370 149 A2 | 5/1990 | |
| EP | 0 375 184 A2 | 6/1990 | |
| EP | 0 423 097 A1 | 4/1991 | |
| EP | 0 469 595 A2 | 2/1992 | |
| EP | 0 474 617 A1 | 3/1992 | |
| EP | 0 305 898 B1 | 5/1992 | |
| EP | 0 490 863 A1 | 6/1992 | |
| EP | 0 505 935 A1 | 9/1992 | |
| EP | 0 779 162 A2 | 6/1997 | |
| EP | 0 943 731 B1 | 9/1999 | |
| EP | 1 065 500 A1 | 1/2001 | |
| EP | 1 300 435 A1 | 4/2003 | |
| FR | 2 656 545 | 7/1991 | |
| JP | 02078425 A | * 3/1990 |
| JP | 3-178429 | 8/1991 | |
| JP | 5-50774 | 3/1993 | |
| JP | 5-67330 | 3/1993 | |
| JP | 5-99927 | 4/1993 | |
| JP | 6-27215 | 2/1994 | |
| JP | 8-83614 | 3/1996 | |
| JP | 11-40157 | 2/1999 | |
| JP | 11-86874 | 3/1999 | |
| JP | 11-120992 | 4/1999 | |
| JP | 11-329443 | 11/1999 | |
| JP | 2000-251924 | 9/2000 | |
| JP | 2002-42784 | 2/2002 | |
| JP | 2002-100362 | 4/2002 | |
| JP | 2003-12311 | 1/2003 | |
| WO | WO 97/12406 | 4/1997 | |
| WO | WO 97/20622 | 6/1997 | |
| WO | WO 97/26134 | 7/1997 | |
| WO | WO 98/21588 | 5/1998 | |
| WO | WO 99/59431 A1 | 11/1999 | |
| WO | WO 00/41704 A1 | 7/2000 | |
| WO | WO 00/52041 A1 | 9/2000 | |
| WO | WO 01/09231 A1 | 2/2001 | |
| WO | WO 01/09259 A1 | 2/2001 | |
| WO | WO 01/09260 A1 | 2/2001 | |
| WO | WO 02/10298 A1 | 2/2002 | |
| WO | WO 02/053762 A2 | 7/2002 | |
| WO | WO 02/060384 A2 | 8/2002 | |
| WO | WO 02/069977 A1 | 9/2002 | |
| WO | WO 03/033462 A2 | 4/2003 | |
| WO | WO 03/054029 A1 | 7/2003 | |

OTHER PUBLICATIONS

Derwent abstract of JP 02078425 A, see above for inventor and date.*

* cited by examiner

SEMIPERMEABLE HYDROPHILIC MEMBRANE

BACKGROUND

Semipermeable membranes can be used for separations or purifications by permitting the flow of a liquid through the membrane while blocking the flow of some or all of the substances that are dispersed or dissolved in the liquid. Substances that are blocked from passing through the membrane are referred to as "retained." Semipermeable membranes can be characterized by the size of the substances that are separated from the liquid. Generally, ultrafiltration membranes retain substances having a size from about 0.002 μm to about 0.05 μm. Microfiltration membranes are typically used to retain substances larger than this, and nanofiltration membranes are typically used to retain substances smaller than this. Membranes for ultrafiltration or nanofiltration are typically made with precise filtration properties so as to retain substances only above a given molecular weight.

Ultrafiltration membranes are especially useful in cross-flow filtration, in which an unfiltered feed liquid flows substantially parallel to the surface of the membrane. As the feed liquid passes across the surface of the membrane, the permeate liquid will pass through the membrane, and the remaining concentrated feed liquid will continue to flow in the same direction as the unfiltered feed liquid. Unlike dead-end filtration processes, in which the flow of unfiltered liquid is perpendicular to the surface of the membrane, the membrane in a cross-flow filtration system is not as susceptible to fouling due to the accumulation of retained substances on the membrane surface. As a result, cross-flow filter membranes typically have a longer service life than dead-end membranes. Moreover, while in service, cross-flow filtration systems typically exhibit more consistent separation capabilities.

A material that has proven useful for making ultrafiltration membranes, including cross-flow filtration membranes, is poly(vinylidene fluoride) (PVDF). This polymer has desirable mechanical properties and also exhibits good resistance to chemical degradation. In addition, PVDF can be formed into membranes having controlled porosity, allowing for good control over the separation and retention characteristics of the membrane. One potential drawback to PVDF is its hydrophobic nature, which makes it difficult to be wetted with aqueous liquids. Most liquid separations involve aqueous liquids, and a hydrophobic membrane will tend to reduce the flow of the liquid through the membrane. In addition, biological substances such as proteins can tend to adhere to hydrophobic surfaces, leading to fouling of the membrane.

A variety of approaches have been described for modifying PVDF membranes to make them hydrophilic rather than hydrophobic. Coating a fully formed PVDF membrane with a hydrophilic polymer can result in a hydrophilic surface. However, this approach greatly increases the complexity of the manufacturing process and can result in a loss of control over the porosity and the retention properties of the membrane. The coating layer can also be degraded by the liquid being filtered, causing the properties of the membrane to change over time.

A slightly simpler approach involves forming the membrane from a mixture of PVDF and a water-soluble polymer such as poly(vinyl pyrrolidone) (PVP). The effect of the PVP additive, however, is not strong enough to provide a permanently hydrophilic membrane that can be dried and re-wetted. Thus, these membranes are usually dried in the presence of a wetting agent to facilitate the formation of a hydrophilic surface. The temporary nature of such a hydrophilic surface also requires the membrane to be maintained in a wetted state. If the membrane is allowed to dry out, it can be difficult or impossible to restore the hydrophilic surface. This increases the complexity of the packaging and shipping of the membrane or of a filter containing the membrane, and also requires the user to monitor the membrane once it is in use. Additional preparation steps, such as flushing the wetting agent from the membrane prior to use, may also be required of the user. Another drawback of this method is that the water-soluble polymer tends to leach out of the membrane fairly quickly, resulting in a short service life.

It is desirable to provide a semipermeable membrane that has a permanent hydrophilic surface, yet can be produced, stored, and used simply and efficiently. A system for producing such a hydrophilic semipermeable membrane would desirably allow for precise control over the retention and flow characteristics of the membrane. A controlled hydrophilic membrane potentially could be useful in ultrafiltration systems, including cross-flow filtration.

BRIEF SUMMARY

In one aspect of the invention, there is a semipermeable membrane, comprising a porous polymeric structure comprising a blend of PVDF and hydroxyalkylcellulose, wherein the membrane is hydrophilic.

In another aspect of the invention, there is an ultrafiltration membrane, comprising a porous polymeric structure comprising a blend of PVDF and hydroxyalkylcellulose in a ratio from about 20:1 to about 5:1. The membrane is hydrophilic and has a molecular weight cut-off from about 1,000 daltons to about 2,000,000 daltons.

In yet another aspect of the invention, there is a filter for ultrafiltration, comprising a semipermeable membrane comprising a blend of PVDF and hydroxyalkylcellulose, wherein the membrane is hydrophilic.

In yet another aspect of the invention, there is a method of making a semipermeable membrane, comprising providing a blend comprising PVDF and hydroxyalkylcellulose, forming the blend into a porous polymeric structure, and purifying the porous polymeric structure; wherein the porous polymeric structure is hydrophilic.

In yet another aspect of the invention, there is a method of making an ultrafiltration membrane, comprising mixing PVDF, hydroxyalkylcellulose, a pore-forming agent, and a solvent to provide a blend; forming at least a portion of the blend into a shaped membrane precursor; contacting the membrane precursor with a quenching environment to provide a porous polymeric structure; and rinsing the structure with a non-solvent. The porous polymeric structure is hydrophilic.

In yet another aspect of the invention, there is a method of making an ultrafiltration membrane, comprising mixing PVDF, hydroxypropylcellulose, a pore-forming agent, and a solvent to provide a blend; casting at least a portion of the blend onto an inert porous substrate to form a membrane precursor; contacting the membrane precursor with an aqueous quenching environment to provide a porous membrane; and rinsing the porous membrane with an aqueous liquid. The blend comprises from about 12 wt % to about 25 wt % PVDF, from about 1 wt % to about 3 wt % hydroxypropyl-cellulose, and from about 2 wt % to about 7 wt % of pore-forming agent; and the ratio of PVDF to hydroxypropylcellulose in the blend is from about 15:1 to about 7:1. The porous membrane is hydrophilic in the absence of a wetting agent, and remains hydrophilic when the membrane is dried.

In yet another aspect of the invention, there is an ultrafiltration membrane, comprising a porous polymeric sheet comprising a blend of PVDF and hydroxyalkylcellulose in a ratio from about 20:1 to about 5:1, and comprising a feed surface and a permeate surface; and a porous inert substrate in contact with the permeate surface. The hydroxyalkylcellulose is selected from the group consisting of hydroxyethylcellulose, hydroxypropyl-cellulose and mixtures thereof. The membrane is hydrophilic in the absence of a wetting agent, and remains hydrophilic when the membrane is dried

DETAILED DESCRIPTION

Figure 1:
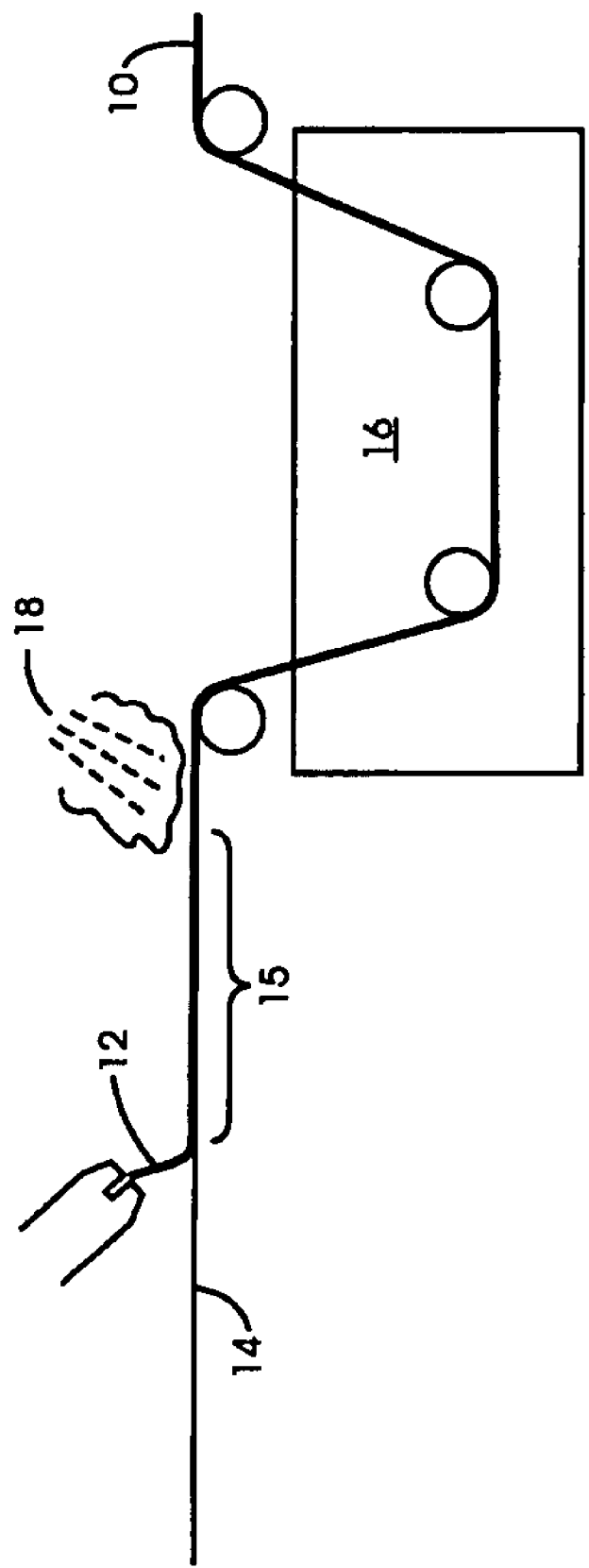
FIG. 1 is a schematic of a process of forming a precursor to a flat sheet membrane.

A hydrophilic semipermeable membrane includes a blend of poly(vinylidene fluoride) (PVDF) and a hydroxyalkylcellulose. The membrane remains hydrophilic in the absence of water or of a wetting agent. The membrane can be prepared by blending PVDF and a hydroxyalkylcellulose and then forming the blend into a porous polymeric structure. In one example, a blend can be prepared by mixing PVDF and a hydroxyalkyl-cellulose with a solvent, casting the mixture onto a substrate, and coagulating the mixture in a quenching environment, such as an aqueous environment. The term porous polymeric structure means a solidified polymeric substance having a plurality of pores. The polymeric substance can be a single polymer or a blend, and it may contain other substances within the bulk of the structure or on the surface of the structure.

Poly(vinylidene fluoride) is a fluorinated polymer that can be processed into membrane form by solution casting methods or by melt processing methods. PVDF has good mechanical strength and durability to endure the near constant force exerted by the flow of liquid when used in filtrations. The temperature resistance of PVDF allows it to be sterilized and to be used in high temperature filtration environments. Also, the polymer is resistant to chemical degradation, which allows it to be used in environments having extreme pH levels or having corrosive ingredients such as chloride ion.

Poly(vinylidene fluoride) is typically made by the radical polymerization of 1,1-difluoroethylene. Commercial sources of PVDF resin include SOLVAY SOLEXIS, INC. (Thorofare, N.J.) and ATOFINA CHEMICALS, INC. (Philadelphia, Pa.).

PVDF resin can be formed into a membrane by casting a solution or suspension of PVDF in a solvent, or by melt processing such as extrusion. These processing methods may also involve coagulating the cast solution or the melt processed material in a quenching environment.

Hydroxyalkylcellulose refers to a class of water-soluble polymers derived from cellulose. Examples of hydroxyalkylcellulose that can be blended with PVDF include hydroxymethylcellulose, hydroxyethylcellulose, hydroxypropylcellulose, hydroxybutylcellulose, and hydroxypentylcellulose. Preferred hydroxyalkylcellulose polymers include hydroxyethylcellulose and hydroxypropylcellulose. More preferably, the hydroxyalkylcellulose in a blend with PVDF is hydroxypropylcellulose. Commercial sources of hydroxyethylcellulose include DOW CHEMICAL COMPANY (Midland, Mich.) and HERCULES, INC. (Wilmington, Del.). Commercial sources of hydroxypropylcellulose include HERCULES, INC.

Hydroxyalkylcellulose is typically prepared by treating cellulose with a base to form alkali cellulose, and then contacting the alkali cellulose with an alkyl chloride or an epoxide compound. See, for example, Stevens, M. P. *Polymer Chemistry*, New York: Oxford University Press, 1999, pp. 487-488. A blend of PVDF and hydroxyalkylcellulose may contain a single type of hydroxyalkylcellulose, or it may contain a mixture of two or more types of hydroxyalkylcellulose. In addition, the polymeric cellulose chains within the hydroxyalkylcellulose can contain a distribution of hydroxyalkyl groups. For example, the cellulose chains can contain two or more of hydroxymethyl groups, hydroxyethyl groups, hydroxypropyl groups, hydroxybutyl groups or hydroxypentyl groups. Such a hydroxyalkylcellulose is referred to herein as a "mixed hydroxyalkylcellulose."

Blends of PVDF and hydroxyalkylcellulose can be prepared by a variety of methods. The term blend means a mixture of two or more polymers. A blend can exist in a solid state, in a melted state, or in a liquid mixture state. A blend in a liquid mixture state includes a solvent in addition to the two or more polymers. In one example, PVDF and hydroxyalkylcellulose can be melted and mixed in an extruder or in a mixer, such as a Braebinder mixer. As a part of melt processing, the polymers may be melted separately and then mixed, they may be combined in the solid state and then melted and mixed together, or one polymer may be melted and the other polymer added as a solid so that it is mixed and melted simultaneously. A melt blend can be extruded through a slot or through one or more orifices to produce a material in a variety of shapes. Shapes that are typically useful in separations include flat sheets and hollow fibers. The extruded material can be used as a semipermeable membrane once it is solidified. Preferably, the extruded material is contacted with a quenching environment to facilitate pore formation. In this example, the extruded material is a shaped membrane precursor, which is formed into the actual membrane.

Preferably, blends of PVDF and hydroxyalkylcellulose are prepared as solution blends in a solvent that can dissolve both polymers. For PVDF and hydroxyalkylcellulose, the solvent is preferably a polar aprotic solvent such as N-methyl pyrrolidone (NMP), N,N-dimethyl acetamide (DMAC), dimethyl formamide (DMF), methyl ethyl ketone (MEK), or methyl isobutyl ketone (MIBK). The solvent for the blend can be a mixture of these solvents and may also include one or more other liquids that are non-solvents for one or both polymers. The polymers can be mixed with portions of the solvent separately and then mixed, they can be mixed with the solvent sequentially, or both polymers can be mixed with the solvent simultaneously. It may be desirable to heat the solvent-polymer mixture while mixing or agitating to facilitate complete dissolution of the polymers.

The blend, whether a melt blend or a solution blend, can also contain other substances without impeding the formation of a membrane with the desired filtration properties. For example, contaminants may be present in low concentrations in the solvent or the polymers. Other ingredients may be specifically added to the blend. These ingredients include, for example, pore-forming agents, viscosity modifiers, compatibilizers, and surfactants.

A solution blend can be used to form a semipermeable membrane by casting or spinning the solution into a shaped membrane precursor and contacting the shaped membrane precursor with a quenching environment. For example, the solution can be cast into the form of a flat sheet by depositing at least a portion of the solution onto an inert substrate. In another example, the solution can be transferred through an annular orifice to form a hollow fiber. In forming hollow fibers, it may be desirable to co-extrude the solution with a non-solvent, such that the blend solution surrounds the non-solvent to form a tubular shape. The sheet or tube of shaped membrane precursor can be contacted with the quenching environment immediately, or there may be a delay between the casting or spinning and the quenching.

The term shaped membrane precursor means a polymeric substance that has been formed or cast into a shape, but which has not yet solidified. A shaped membrane precursor can become a porous polymeric structure when solidified under the appropriate conditions. A solidified state includes solid polymeric substances below their melt temperature or flow temperature, and also includes gelled polymeric substances.

The term quenching environment means any environment that causes a polymer to precipitate from a dissolved state into a solidified state. Typically, the quenching environment is a bath of a liquid that is a non-solvent for one or both polymers. The term non-solvent, when used in reference to a polymer, means a liquid that, when added to a solution of the polymer in a solvent, will cause phase separation of the solution at some concentration. The quenching environment may also be an atmosphere that contains substantial amounts of the vapor of a non-solvent. The quenching of the shaped membrane precursor can occur in a single procedure or in more than one procedure. For example, the quenching of a cast sheet can involve simply moving the substrate supporting the sheet into a bath of the quenching liquid. In another example, the quenching of a cast sheet can involve exposing the sheet to an atmosphere saturated with the quench liquid, followed by moving the substrate and sheet into a bath of the quenching liquid. Exposing the shaped membrane precursor to a saturated atmosphere can be accomplished, for example, by spraying a mist of the quench liquid on or around the solution.

The quenching liquid may contain a single liquid or a mixture of liquids and may also contain one or more substances dissolved or dispersed in the liquid. Examples of other substances that may be present in the quench liquid include pore-forming agents, surfactants, viscosity modifiers and preservatives. Preferably the quenching liquid is an aqueous liquid, and more preferably the quenching liquid is water. If the quenching environment is a bath, the composition of the bath will change as increasing amounts of shaped membrane precursor are passed through the bath. In order to maintain consistent quenching properties of the bath, it may be desirable to exchange the used quench liquid with fresh quench liquid. The exchange of the quench liquid may be done through a continuous flow, or it may be performed by a batch method. It may also be desirable to stir or agitate a quench bath so as to reduce the magnitude of any concentration or temperature gradients within the quenching environment.

It is preferable to include a pore-forming agent in the solution blend when forming membranes using a quenching environment. A pore-forming agent is a substance that is soluble in the blend solvent and that may or may not be soluble in the quenching environment. The presence of a pore-forming agent can provide for greater control over the size and distribution of pores in the porous polymeric structure that is formed from the coagulation in the quenching environment. Preferably the pore-forming agent in its pure state at room temperature is a water-soluble solid. Examples of pore-forming agents include salts and phenols. For example, salts of alkali metals, alkaline earth metals, transition metals or ammonium with halides or carbonates can be used as pore-forming agents. Specific examples include ammonium chloride, calcium chloride, magnesium chloride, lithium chloride, sodium chloride, zinc chloride, calcium carbonate, magnesium carbonate, sodium carbonate, and sodium bicarbonate. Examples of phenols include phenol, ethylphenol, catechol, resorcinol, hydroquinone and methoxyphenol. Other conventional pore-forming agents include non-solvent liquids and also include polymers such as poly (vinyl alcohol), poly(vinyl pyrrolidone) and hydroxyalkylcellulose polymers.

After quenching the blend solution to form a semipermeable membrane from the shaped membrane precursor, it may be desirable to perform additional processing of the membrane. The membrane may be rinsed with one or more non-solvents to remove residual solvent, quench liquid or other substances from the polymeric structure of the membrane. The membrane may be subjected to vacuum treatment to extract residual solvent, quench liquid, rinse liquid or other substances from the membrane. The membrane may be contacted with substances such as surfactants, wetting agents or surface coating agents. The term wetting agent means a substance added to a pre-formed semipermeable membrane to increase the hydrophilicity of the membrane, but which is not integral with the membrane. The membrane may be subjected to surface modification by treatment with reagents and/or electromagnetic treatments. For example, the hydroxyl groups in the hydroxyalkylcellulose could be reacted with other substances so as to form a coated or modified surface. Preferably the membranes formed from blends of PVDF and hydroxyalkylcellulose are not subjected to additional surface treatments, but rather exhibit the desired porosity, hydrophilicity, and surface characteristics after quenching and subsequent purification, if any. The membrane may be dried by treatment with heat and/or vacuum.

A schematic of an exemplary process of forming a membrane sheet is illustrated in FIG. 1. In this example, a membrane sheet 10 may be formed by casting a blend solution 12 onto a moving substrate 14 to form a shaped membrane precursor. Preferably the shaped membrane precursor travels a certain distance 15 before it is exposed to a quenching environment. The membrane precursor and substrate are subsequently passed through a quench bath 16. Prior to contact with the quench bath, the membrane precursor optionally may be exposed to a mist or spray of a quench liquid 18. Preferably the substrate is a porous sheet of inert material. The term inert material means a material that does not significantly affect the type or size of substances retained by the membrane. Examples of inert porous substrates include porous webs of synthetic fibers, which may be woven or non-woven. Examples of synthetic fibers include polyethylene, polypropylene, polyesters, and polycarbonates. Preferably the inert porous substrate is a nonwoven web of synthetic fibers. A specific example of a useful inert porous substrate is a nonwoven web of polyethylene, polypropylene, or poly(ethylene terephthalate), such as nonwoven products available from AHLSTROM FIBERCOMPOSITES (Windsor Locks, Conn.) and from CRANE NONWOVENS (Dalton, Mass.).

Figure 2:
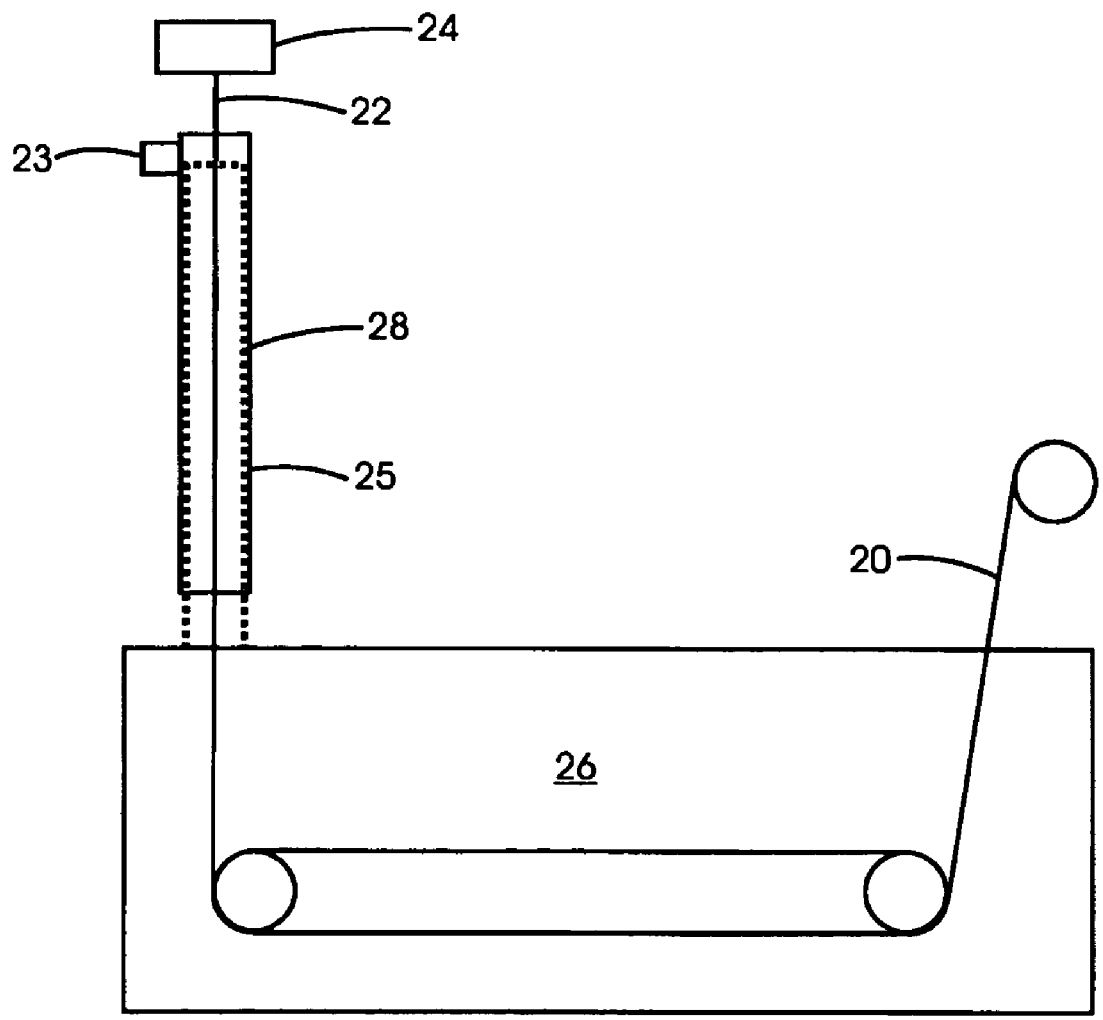
FIG. 2 is a schematic of a process of forming a precursor to a hollow fiber membrane.

A schematic of an exemplary process of forming hollow fiber membranes is illustrated in FIG. 2. In this example, one or more membrane fibers 20 may be formed by extruding a blend solution 22 through a spinneret 24 and subsequently passed through a quench bath 26. Prior to contact with the quench bath, the tubular shaped membrane precursor formed by spinning the solution optionally may be passed through a quench column 28. The quench column includes an inlet 23 for a quench liquid 25 that cascades over and around the tubular structure. The blend solution may be co-extruded with an aqueous liquid to further stabilize the tubular shape of the precursor.

Figure 3:
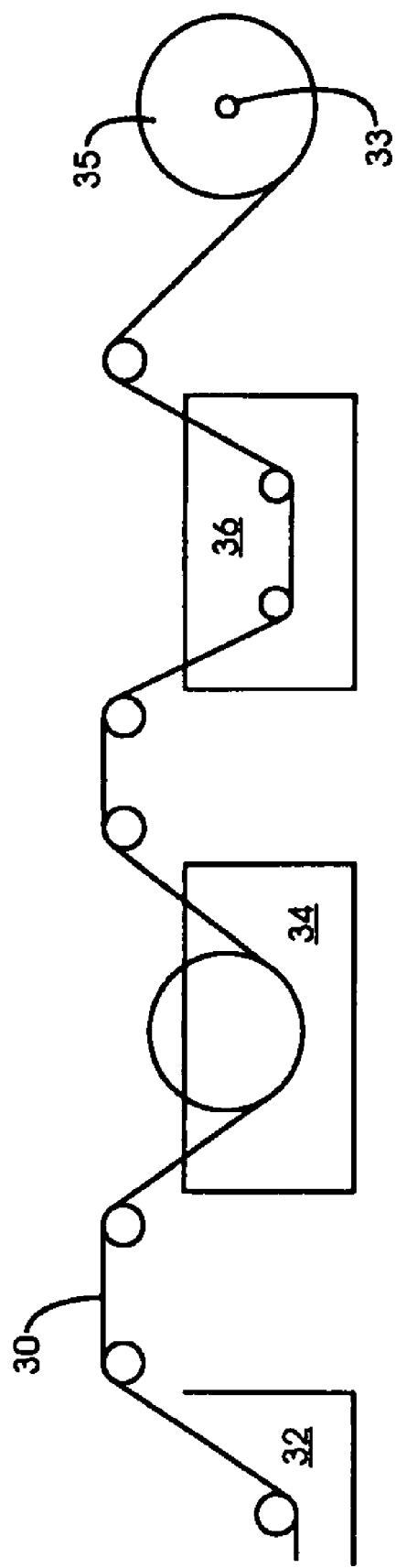
FIG. 3 is a schematic of a semipermeable membrane production process using a blend solution.

A schematic of the subsequent steps in an exemplary membrane production process is illustrated in FIG. 3. A membrane element 30, which may be a flat sheet or one or more hollow fibers, is passed from a quench bath 32 and then into a rinse bath 34. From the rinse bath, the membrane may optionally be passed into a third bath 36. The third bath may be, for example, a supplemental rinse bath, a controlled temperature bath such as an annealing bath having an elevated temperature, and/or a surface treatment or wetting agent-bath. The dried membrane can then be transferred directly to other apparatus for further processing, or it can be wrapped around a roller or mandrel 33 to form a rolled membrane 35 for storage. Further purification and/or processing steps may include drying the membrane, cutting the membrane into individual portions that can be used in a filter, or cutting the membrane into larger portions for storage or inspection. Flat sheet membranes can be inspected for defects using the integrity testing system disclosed in U.S. Pat. application Publication No. 2002/0176617 A1 (Ser. No. 09/862,683; filed May 22, 2001), which is incorporated herein by reference.

The transportation of the membrane through the production process can be varied widely, and any method of web transportation may be used. If rollers are used, the membrane may contact the rollers directly, or the membrane may be supported on a belt or screen that passes over the rollers. If belts or screens are used, the membrane may be transferred from one substrate to another using known web or fiber transfer methods. One or more of the rollers may be a vacuum roller such that a reduced pressure is applied to the side of the membrane that is nearest the roller. An example of a vacuum roller useful for rinsing a semipermeable membrane is the flushing roller system disclosed in U.S. Pat. application Publication No. 2002/0108637 A1 (Ser. No. 09/781,602; filed Feb. 12, 2001), which is incorporated herein by reference. One or more of the rollers may have an adjustable temperature so that the membrane can be in an environment having a temperature above or below the ambient temperature. For example, a heated roller can be used to perform or to contribute to the drying of the membrane. The membrane may pass through the quench or rinse baths in a linear fashion, or it may be in constant or intermittent contact with one or more rollers.

The retention properties of a semipermeable membrane are dependent on the structure of the membrane and on the surface characteristics of the membrane. Membrane structure variables include the size of the pores in the membrane, the number of pores, the distribution of pore sizes and any pore size gradients (i.e. asymmetry), and the presence or absence of a non-porous skin on a surface of the membrane. For flat sheet membranes, structural variables also include the sheet thickness. For hollow fibers, structural variables also include the inner and outer diameters of the fiber and the wall thickness. Membrane surface variables include the hydrophilic or hydrophobic nature of the membrane and the presence or absence of any cationic or anionic charges on the surface. The term hydrophilic, in reference to a membrane, in general means the membrane is wet by an aqueous process fluid without the addition of surfactants or low surface tension liquids. Specifically, a membrane is considered hydrophilic if, when subjected to the Hydrophilicity Test described herein, a 0.5 mL drop of water is absorbed by a rinsed and dried 90 mm disk portion of the membrane within one hour.

Semipermeable membranes containing a blend PVDF and hydroxyalkylcellulose are preferably ultrafiltration membranes. The term ultrafiltration membrane means a membrane having a molecular weight cut-off from about 1,000 daltons to about 2,000,000 ($2 \times 10^6$) daltons. The term molecular weight cut-off means that dissolved substances having a molecular weight above the cut-off are retained at a level of at least 90%. Ultrafiltration membranes may be made so as to have a molecular weight cut-off anywhere within this range. Preferably, ultrafiltration membranes containing a blend of PVDF and hydroxyalkylcellulose can have a molecular weight cut-off from about 3,000 daltons to about 1,000,000 ($10^6$) daltons, or from about 10,000 daltons to about 500,000 daltons.

The membrane structure can be controlled by adjusting a wide variety of parameters. In a solution blend process, the more influential parameters include the composition and viscosity of the blend solution, the molecular weights of the polymers, the temperature of the blend solution as it is formed into a sheet or hollow fiber, the distance between the area where the solution is formed into a shaped membrane precursor and the quench bath, and the temperature and composition of the quench bath.

FIGS. 4 through 7 show Scanning Electron Microscope (SEM) images of cross-sections of hydrophilic membranes containing a blend of PVDF and a hydroxyalkylcellulose. The lower half of each image shows the nonwoven fibers of the porous substrate onto which the membrane has been formed. The membranes, appearing in the upper half of each image, are characterized by an upper membrane surface at the top, which is supported by regular columnar wall structures. The supporting wall structures define regimented finger voids extending between the upper and lower surfaces of the membrane.

For ultrafiltration membranes formed from a solution blend, the solution blend preferably contains from about 5 to about 40 wt % PVDF. More preferably, the solution blend contains from about 7 to about 30 wt % PVDF, even more preferably from about 10 to about 25 wt % PVDF, and even more preferably from about 12 to about 23 wt % PVDF. Preferably the solution blend contains from about 0.5 to about 10 wt % hydroxyalkyl-cellulose. More preferably, the solution blend contains from about 0.75 to about 5 wt % hydroxyalkylcellulose, and even more preferably from about 1 to about 3 wt % hydroxy-alkylcellulose. Preferably the ratio of PVDF to hydroxyalkylcellulose is from about 20:1 to about 5:1, and more preferably the ratio of PVDF to hydroxyalkylcellulose is from about 15:1 to about 7:1. Preferably the solution blend contains from about 1 to about 10 wt % pore-forming agent. More preferably, the solution blend contains from about 2 to about 7 wt % pore-forming agent.

It has been surprisingly found that a semipermeable membrane containing a blend of PVDF and a hydroxyalkylcellulose can have a permanent hydrophilic surface. Such a hydrophilic semipermeable membrane is hydrophilic in the absence of a wetting agent and remains hydrophilic even after it has been dried. Since membranes containing a PVDF/hydroxyalkyl-cellulose blend can be hydrophilic in the absence of a wetting agent, the production of these membranes can be simplified by eliminating any application of wetting agent to the surface of the membrane. Moreover, the membranes have little or no extractable material when they are incorporated into a filter, and filters containing the membranes do not need to be flushed with water prior to use.

Since membranes containing a PVDF/hydroxyalkylcellulose blend can be hydrophilic even after they have been dried, the membranes can be stored, shipped and/or processed in a dry state. Membranes that remain hydrophilic when dried can be wetted by aqueous liquids without being pre-treated with another solvent or wetting agent. The ability to dry these membranes provides for easier storage and distribution of the membranes or of filters containing the membranes. Typically, membranes that are stored or distributed in a hydrated form require the presence of a biocide to prohibit the growth of bacteria. In addition, filters containing the membranes are more robust, and their moisture content does not need to be monitored as carefully.

Hydrophilic membranes containing a blend of PVDF and a hydroxyalkylcellulose can be used in filtration systems. The hydrophilic membranes can be incorporated into a filter simply by attaching or positioning a portion of the membrane in the appropriate location and securing the membrane to the rest of the filter. The term filter means anything that can be used for filtration or separation, and includes both complete filtration systems and individual filter elements. A filter element is an assembly that contains the membrane and that typically can be removed from the filtration system and replaced.

Filters containing hydrophilic membranes are preferably configured such that the unfiltered feed fluid is transported across one surface of the membrane in a tangential direction. Thus, the membrane will have a feed surface, in contact with the unfiltered feed fluid, and a permeate surface, in contact with the permeate fluid. For hollow fiber membranes, the feed fluid can be made to flow across the outer surface of the fiber or through the interior of the fiber. For flat sheet membranes that are supported by a porous inert substrate, the feed surface is the exposed surface, and the permeate surface is in contact with the inert substrate.

Hydrophilic membranes can be incorporated into a filter in the form in which the membrane is produced. For example, hollow fiber membranes can be bundled and trimmed and then incorporated into a filter. Flat sheet membranes can be cut into an appropriate shape and incorporated into a filter in a planar form. In a variety of filter systems, including spiral wound systems described below, the membrane is glued to one or more components of the filter. Glue penetration into the membrane and the resulting adhesion between the membrane and another filter component are significantly enhanced if the glue is applied to a dry membrane. The ability to dry and re-wet these hydrophilic membranes thus allows for improved incorporation of the membranes into filters.

Figure 8:
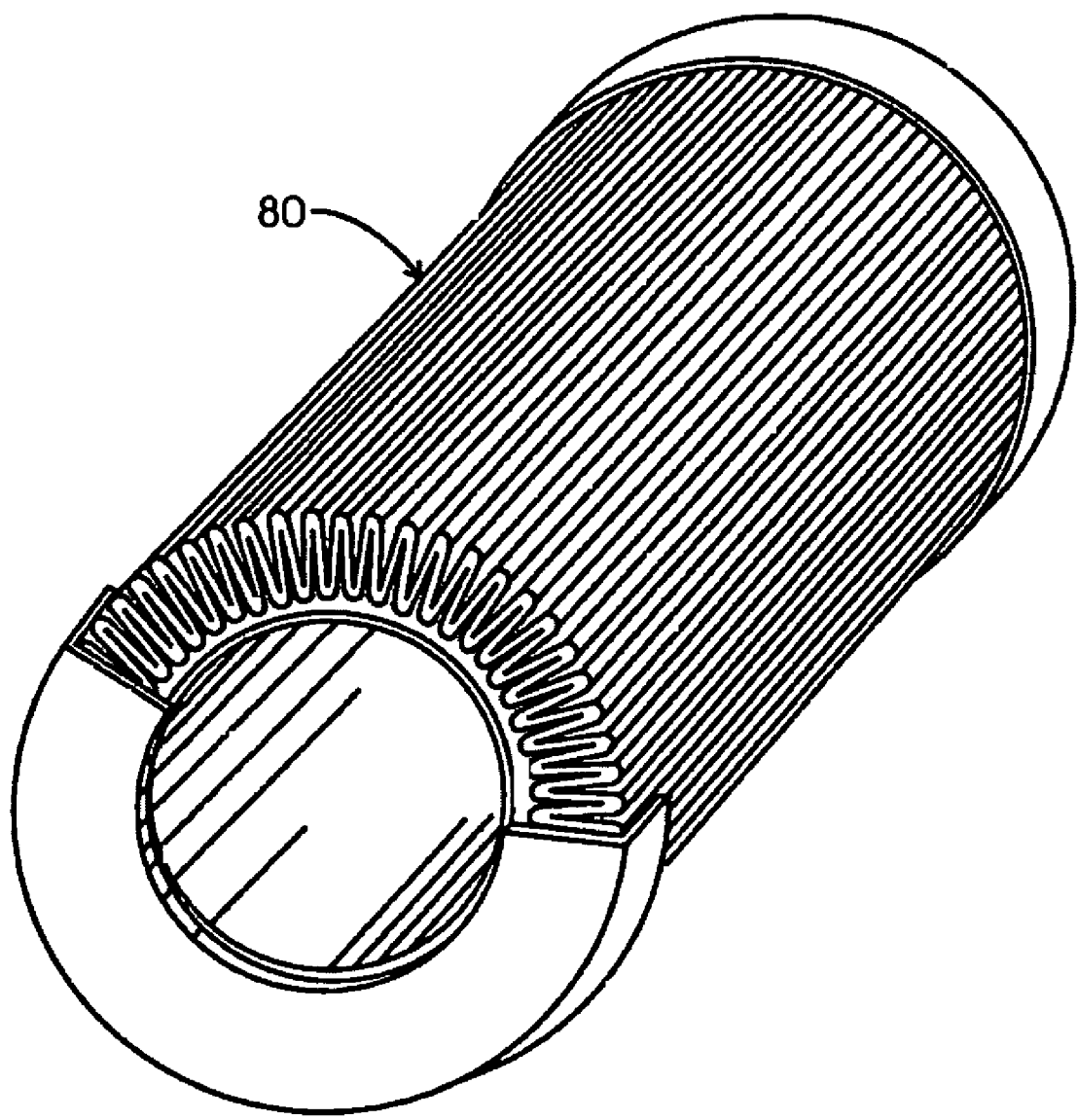
FIG. 8 is a view of a pleated filter element containing a semipermeable membrane.

Hydrophilic membranes also can be incorporated into a filter through additional processing steps, such as lamination with fabrics or spacers. Flat sheet membranes can be pleated and/or spiral wound to increase the surface area available for the separations. Examples of pleated flat sheet membranes include the pleated systems disclosed in U.S. Pat. No. 4,663,041 (Miyagi et al.; issued May 5, 1987), which is incorporated herein by reference. FIG. 8 illustrates an example of a pleated filter element 80 that could be used in a filter.

An example of a cross-flow ultrafiltration system that may be used with hydrophilic semipermeable membranes is the spiral wound filtration system disclosed in U.S. Pat. application Publication No. 2003/0034116 A1(Ser. No. 10/223,165; filed Aug. 19, 2002), which is incorporated herein by reference. For example, referring to FIG. 9 a cylindrical spiral wound filter element 100 may be placed within a housing. Seals may be placed within the housing to force unfiltered feed fluid flowing into the housing to pass through the spiral wound filter element. Unfiltered feed fluid 150 is introduced to a thin cross-section of each filter membrane. The spiral wound filter element has a permeate outlet tube 102 that collects permeate 160 that has passed through the filter membrane(s), and concentrated feed fluid 170 may exit the housing from the opposite end from the feed flow inlet.

Figure 9:
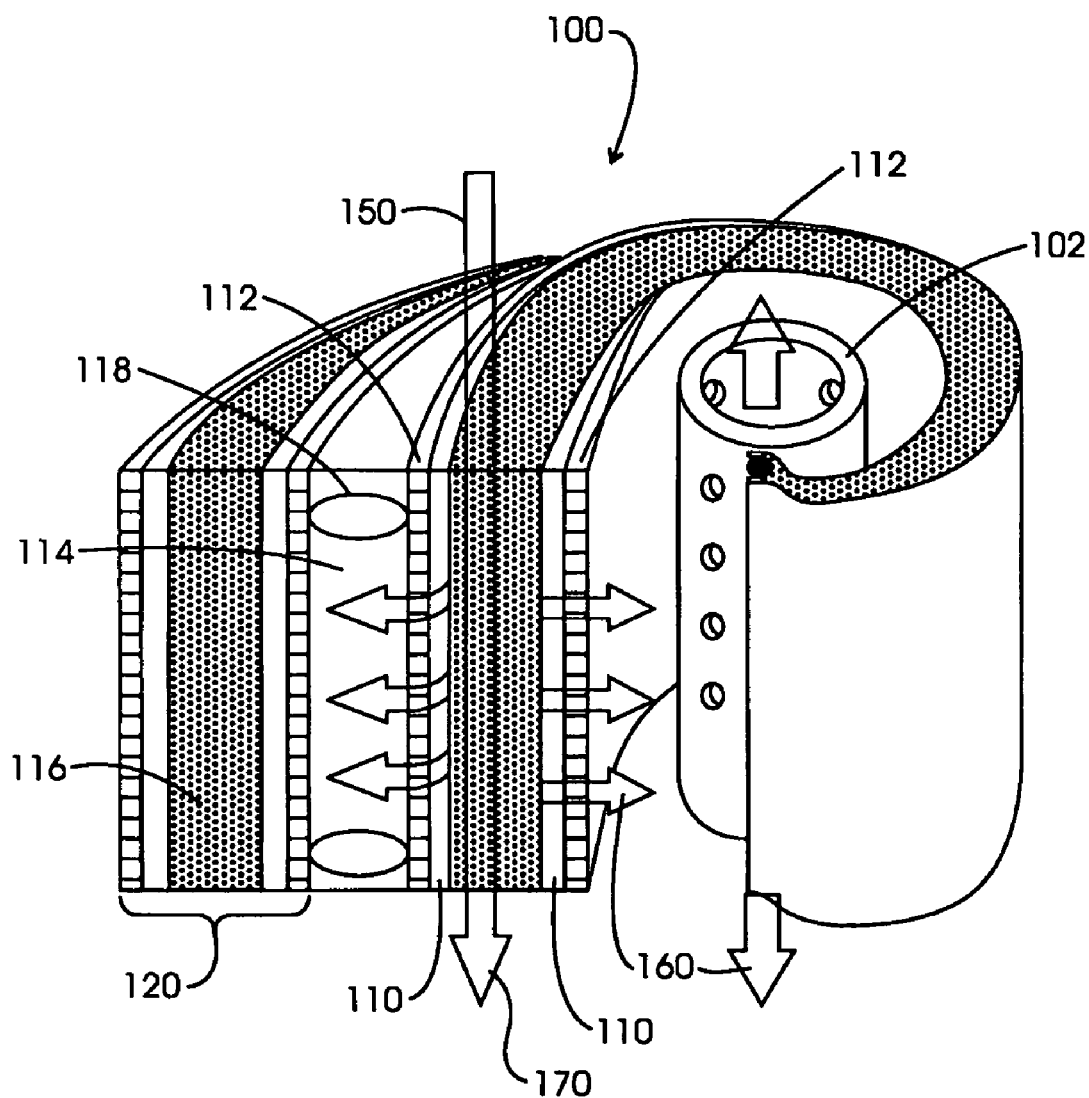
FIG. 9 is a view of a spiral filter element containing a semipermeable membrane.

Referring still to FIG. 9, in this type of filter the filter membrane 110, which is supported by the inert porous substrate 112, may be folded around a feed fluid layer 116 to form an envelope 120 so that the inert substrate forms the outer surface of the envelope. The spacer material used for the feed fluid layer 116 can be an inert web, such as NALTEX polypropylene netting available from DELSTAR TECHNOLOGIES, INC. The inert substrate may then be adhered to a permeate transport layer 114 along a glue line 118. The material used for the permeate transport layer 114 can be an inert fabric sheet, such as a Tricot fabric sheet. The glue line 118 can prevent unfiltered feed fluid 150 from entering the permeate transport layer either directly through the cross-section of the fabric sheet of the layer or through the cross-section of the inert substrate. A typical spiral wound filter can have several layers permeate transport layer material with a corresponding number of filter membrane envelopes between the permeate transport layers. When the layers of permeate transport material and the envelopes are wrapped around a permeate outlet tube 102, the permeate transport layers act to direct the permeate 160 to the permeate outlet tube, and the feed spacer material serves to direct unfiltered feed fluid 150 and concentrate 170 along the desired flow path.

EXAMPLES

Example 1

PVDF/HPC Membrane (about $10^6$ Dalton Cutoff)

N-methyl pyrollidone (NMP) was added to a mixer configured as a single-shaft disperser. The amount of solvent was about 189.6 pounds (lb, 86.0 kilograms (kg)). Poly(vinylidene fluoride) (PVDF, about 33.6 lb, 15.2 kg) and hydroxypropyl cellulose (HPC, about 4.8 lb, 2.2 kg) were then added to the solvent gradually. The PVDF was HYLAR 461 from SOLVAY SOLEXIS. The HPC was KLUCEL-Type L, having a molecular weight of about 95,000 daltons, from HERCULES, INC. The mixer was a MODEL 775A mixer from MYERS ENGINEERING, INC. (Bell, Calif.). This mixture was then mixed at a speed of about 1070 revolutions per minute (rpm) and heated over a period of about 4.5 hours until the temperature of the mixture reached about 156-160° F. (69-71° C.). After mixing and heating for about 2 hours, about 12.0 lb (5.4 kg) of lithium chloride (LiCl) was added. The final composition of the casting mixture was about 79.0 percent by weight (wt %) NMP, about 14.0 wt % PVDF, about 2.0 wt % HPC, and about 5.0 wt % LiCl.

Figure 4:
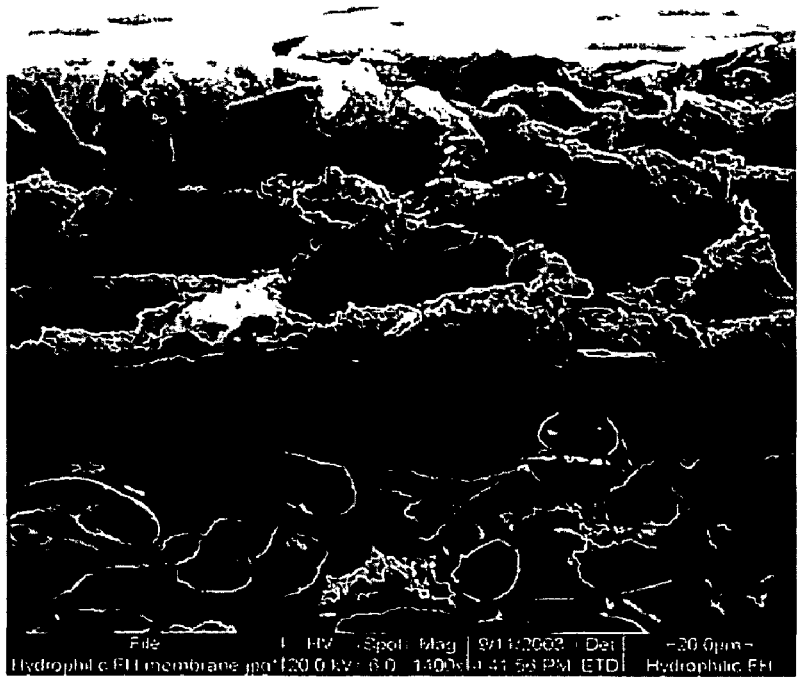
FIG. 4 is a Scanning Electron Microscope (SEM) image of a cross-section of a hydrophilic membrane having a molecular weight cut-off of about $10^6$ daltons.

The casting mixture was then allowed to cool to about 115° F. (46° C.). The mixture was spread onto a porous polyester substrate moving at a speed of about 10 feet per minute (fpm) (3.0 meters per minute (m/min)), having a width of about 41.5 inches (105 centimeters (cm)) and a casting knife height above the substrate of about 0.012 inches (0.305 millimeters (mm)). The substrate was CUH calendared poly(ethylene terephthalate) nonwoven sheet from CRANE NONWOVENS. After traveling a distance of about 8-9 inches (20-23 cm), the mixture on the substrate was then passed into a quench bath of deionized water at a temperature of about 85° F. (29° C.), where the residence time of the mixture in this quench bath was about 2.5minutes. The quenched membrane was then passed through a rinse bath of deionized water at a temperature of about 75° F. (24° C.), with a residence time of about 3.5 minutes. Finally, the membrane was passed through an anneal bath of deionized water at a temperature of about 121° F. (49° C.) for a residence time of about 3.5 minutes and then wound onto a roll. The bubble point of the membrane was about 8 psig (55 kiloPascals (kPa)), and the delamination pressure was about 11 psig (76 kPa). FIG. 4 shows an SEM image of a cross section of this membrane.

Example 2

PVDF/HPC Membrane (about 500,000 Dalton Cutoff)

NMP (about 186 lb, 84.4 kg) was added to a MODEL 775A mixer, and to this solvent was added PVDF (about 37.2 lb, 16.9 kg) and HPC (about 4.8 lb, 2.2. kg). This mixture was then mixed at a speed of about 1050 rpm and heated over a period of about 2.75 hours until the temperature of the mixture reached about 156-160° F. (69-71° C.). After mixing and heating for about 2 hours, about 12.0 lb (5.4 kg) of LiCl was added. The PVDF, HPC, and the mixer were as described for Example 1. The final composition of the casting mixture was about 77.5 wt % NMP, about 15.5 wt % PVDF, about 2.0wt % HPC, and about 5.0 wt % LiCl.

Figure 5:
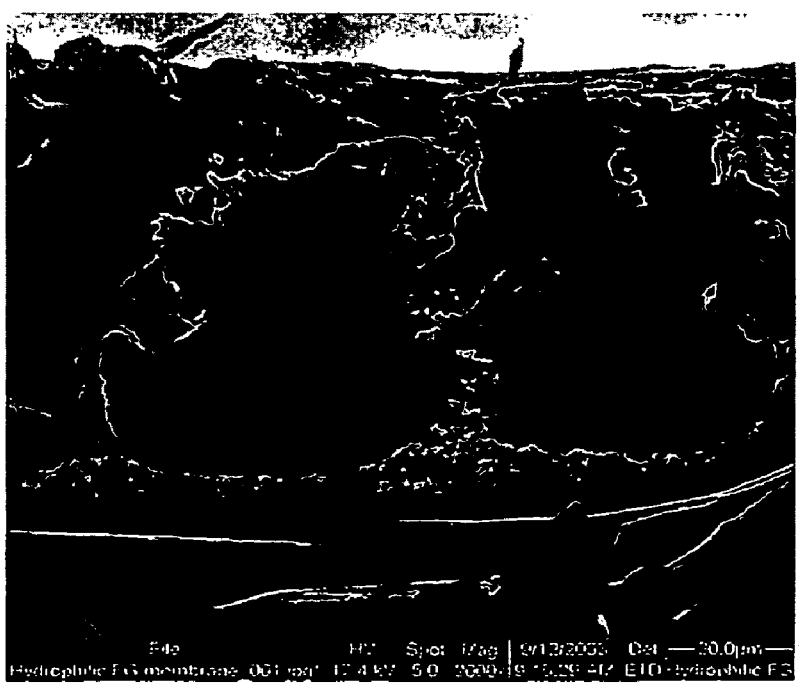
FIG. 5 is an SEM image of a cross-section of a hydrophilic membrane having a molecular weight cut-off of about 500,000 daltons.

The casting mixture was then allowed to cool to about 119° F. (48° C.). The mixture was spread onto a porous polyester substrate, as used in Example 1, moving at a speed of about 10 fpm (3.0 m/min), having a width of about 42 inches (107 cm) and a casting knife height above the belt of about 0.012 inches (0.305 mm). After traveling a distance of about 8-9 inches (20-23 cm), the mixture on the substrate was then passed into a quench bath of deionized water at a temperature of about 86° F. (30° C.), where the residence time of the mixture in this quench bath was about 2.5 minutes. The quenched membrane was then passed through a rinse bath of deionized water at a temperature of about 70° F. (21° C.), with a residence time of about 3.5 minutes. Finally, the membrane was passed through an anneal bath of deionized water at a temperature of about 122° F. (50° C.) for a residence time of about 3.5minutes and then wound onto a roll. The bubble point of the membrane was about 14 psig (96.5 kPa), and the delamination pressure was about 12 psig (82.7 kPa). FIG. 5 shows an SEM image of a cross section of this membrane.

Example 3

PVDF/HPC Membrane (about 100,000 Dalton Cutoff)

NMP (about 191 lb, 86.6 kg) was added to a MODEL 775A mixer, and to this solvent was added LiCl (about 12.8 lb, 5.8). This mixture was then mixed at a speed of about 1100 rpm and heated over a period of about 3.5 hours until the temperature of the mixture reached about 173-178° F. (78-81° C.). After mixing and heating for about 30 minutes, PVDF (about 41.2 lb, 18.7 kg) and HPC (5.0 lb, 2.3 kg) were added. The PVDF, HPC, and the mixer were as described for Example 1. The final composition of the casting mixture was about 76.4 wt % NMP, about 16.5 wt % PVDF, about 2.0 wt % HPC, and about 5.1 wt % LiCl.

Figure 6:
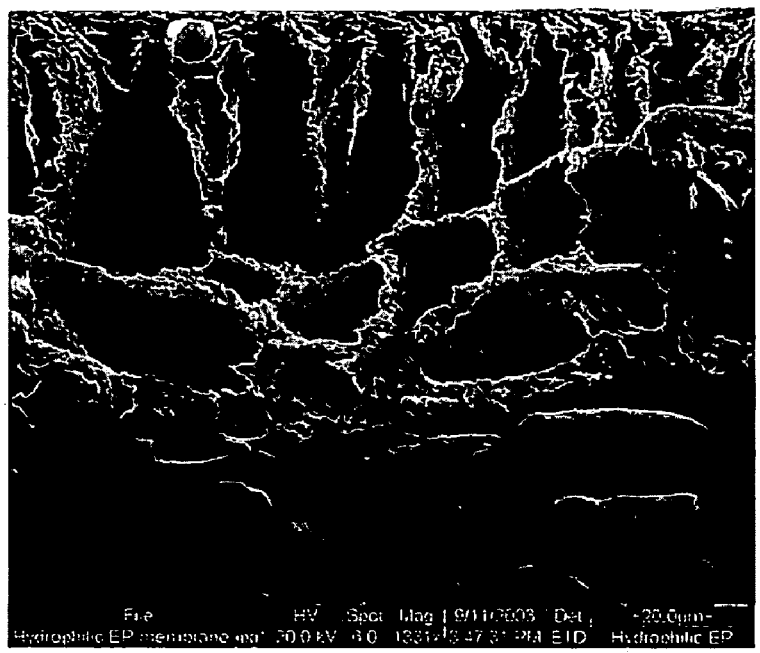
FIG. 6 is an SEM image of a cross-section of a hydrophilic membrane having a molecular weight cut-off of about 100,000 daltons.

The casting mixture was then allowed to cool to about 105° F. (41° C.). The mixture was spread onto a porous polyester substrate, as used in Example 1, moving at a speed of about 10 fpm (3.0 m/min), having a width of about 42 inches (107 cm) and a casting knife height above the belt of about 0.012 inches (0.305 mm). After traveling a distance of about 8-9 inches (20-23 cm), the mixture on the substrate was then passed into a quench bath of deionized water at a temperature of about 49° F. (9.4° C.), where the residence time of the mixture in this quench bath was about 2.5 minutes. The quenched membrane was then passed through a rinse bath of deionized water at a temperature of about 70° F. (21.1° C.), with a residence time of about 3.5minutes. Finally, the membrane was passed through an anneal bath of deionized water at a temperature of about 122° F. (50° C.) for a residence time of about 3.5 minutes and then wound onto a roll. The bubble point of the membrane was about about 31 psig (214 kPa), and the delamination pressure was about 8 psig (55 kPa). FIG. 6 shows an SEM image of a cross section of this membrane.

Example 4

PVDF/HPC Membrane (about 5,000 Dalton Cutoff)

NMP (about 186.2 lb, 84.5 kg) was added to a MODEL 775A mixer, and to this solvent was added PVDF (about 48.8 lb, 22.1 kg). This mixture. was then mixed at a speed of about 1150. rpm and heated over a period of about 3.3 hours until the temperature of the mixture reached about 173-178° F. (78-81° C.). After mixing and heating for about 30 minutes, HPC (5.0 lb, 2.3kg) was added. After mixing and heating for a total of about 3 hours, LiCl (10lb, 4.5 kg) was added. The PVDF was KYNAR 761 from ATOFINA CHEMICALS, INC. The HPC and the mixer were as described for Example 1.The final composition of the casting mixture was about 74.5 wt % NMP, about 19.5 wt % PVDF, about 2.0 wt % HPC, and about 4.0 wt % LiCl.

Figure 7:
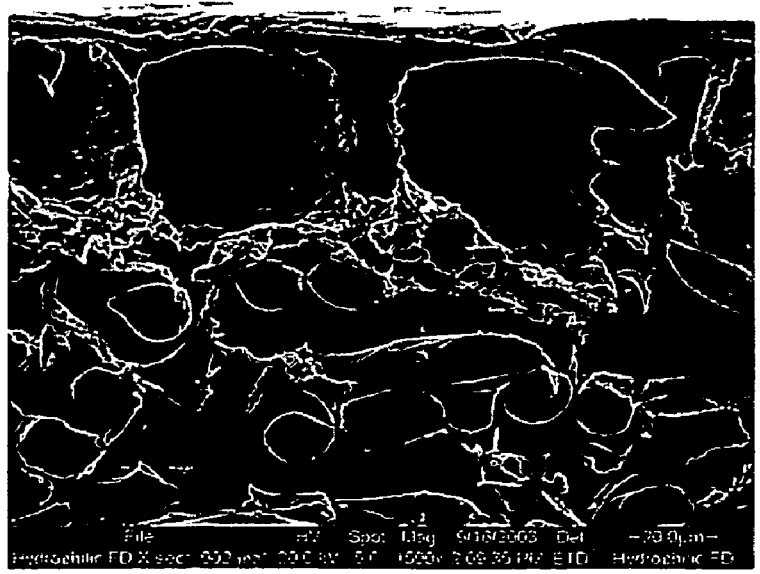
FIG. 7 is an SEM image of a cross-section of a hydrophilic membrane having a molecular weight cut-off of about 5,000 daltons.

The casting mixture was then allowed to cool to about 94° F. (34° C.). The mixture was spread onto a porous polyester substrate, as used in Example 1, moving at a speed of about 10 fpm, having a width of about 42inches (107 cm) and a casting knife height above the belt of about 0.012inches (0.305 mm). After traveling a distance of about 8-9 inches (20-23 cm), the mixture on the substrate was then passed into a quench bath of deionized water at a temperature of about 41° F. (5° C.), where the residence time of the mixture in this quench bath was about 2.5 minutes. The quenched membrane was then passed through a rinse bath of deionized water at a temperature of about 75° F. (24° C.), with a residence time of about 3.5 minutes. Finally, the membrane was passed through an anneal bath of deionized water at a temperature of about 115° F. (46° C.) for a residence time of about 3.5 minutes and then wound onto a roll. The bubble point of the membrane was about 25psig (172 kPa), and the delamination pressure was about 17 psig (117 kPa). FIG. 7 shows an SEM image of a cross section of this membrane.

Example 5

Membrane Drying

Samples of the membranes of Examples 1-4 were dried in an oven. For a given sample, the end of the membrane on the outside of the roll was attached to a sheet of transfer material.

This transfer material was then threaded through an oven box and onto a take-up shaft. Tension was kept on the sheet by threading the sheet partially around rollers at given points between the membrane roll and the take-up roll. The oven box was heated to 250° F. (121° C.), and then the take-up shaft was rotated so as to wind the transfer material, and subsequently the membrane sheet, into a roll. The speed of the sheet was adjusted so as to be slow enough to provide sufficient drying in the oven, yet rapid enough to prevent overheating and warping of the sheet. Typical sheet speeds were between about 4-5 fpm (1.2-1.5 m/min).

This type of dryer box system can also be used in connection with a sheet treatment apparatus. For example, the sheet can be passed through a bath or a spray of a treatment liquid, such as a coating liquid or a wetting agent. Excess liquid can be removed from the sheet before it enters the dryer by applying one or more jets of air onto the sheet.

Hydrophilicity Testing

The hydrophilicity of membranes was tested by measuring the wettability of a membrane before and after rinsing. A disk having a diameter of 90 mm was cut from the membrane, a 0.5 milliliter (mL) drop of deionized water was then placed on the surface of the disk via EPPENDORF pipette (BRINKMANN INSTRUMENTS, INC., Westbury, N.Y.), and the area of the of the drop was measured. The disk was then rinsed 5 times in deionized water for 8 hours each. After each 8-hour rinse, the disk was dried in an oven at 60° F. (15.6° C.) for 4 hours to remove residual water from the membrane. The total volume of rinse water was 257 liters. A 0.5 mL drop of deionized water was then pipetted onto the surface of the rinsed and dried disk, and the area of the drop was measured over time. A membrane was considered hydrophilic if the water drop on the rinsed and dried disk was absorbed within 1 hour, and was considered hydrophobic if the water drop instead formed a bead on the surface.

The membrane of Example 1 was dried according to Example 5. This membrane was then tested for hydrophilicity, as was a conventional PVDF ultrafiltration membrane having a molecular weight cut-off of about 1,000,000 daltons. The conventional PVDF membrane was a FH membrane available from PTI ADVANCED FILTRATION, INC. (Oxnard, Calif.). This conventional PVDF membrane, referred to as "Control A", did not include a blend of PVDF with a hydroxyalkylcellulose. The Control A membrane was dried in an oven at 60° F. for 4 hours prior to testing.

The Control A membrane was not wetted by the drop of water, either before rinsing or after rinsing. The water drop was initially measured at an area of 20 mm×20 mm, and after 7 hours the drop had not spread beyond this initial area. For the hydroxyalkylcellulose containing membrane of Example 1, the water drop was initially measured at an area of 20 mm×20 mm. After 10 minutes, the drop had spread to 50 mm×50 mm, and the water had partially disappeared from the surface. After 25 minutes, the water had completely disappeared from the surface, leaving a final spreading area of 62 mm×62 mm. For both membranes, the wetting test yielded identical results before and after the rinsing and drying procedure. Thus, the Control A membrane was hydrophobic, and the membrane of Example 1 was hydrophilic.

Extractables Testing

The extractable material from a membrane was measured by soaking the membrane in water and comparing the nonvolatile residue from the soaking water with a control water sample. Cleaned and dried 500 mL graduated cylinders were filled with 500 mL deionized water. For all but one cylinder, a sample having an area of 10 square feet (sq-ft) was cut from a membrane and slowly immersed in the cylinder. All the cylinders were then covered with plastic wrap for 24 hours. The soaked membranes were then slowly removed and were suspended above their respective cylinder to maximize the amount of liquid recovered from the membrane. Each cylinder was then emptied into a separate cleaned and dried 500 mL beaker on a hot plate to slowly evaporate the water. When the volume was reduced to 25 mL, the contents were then transferred to a cleaned, dried, and tared 50 mL beaker to continue the evaporation. Once the liquid was visibly absent, the beaker was dried in an oven at 80° C. for 10 minutes and then cooled in a desiccator for at least 30 minutes. The dry weight of each sample was calculated as the difference between the final weight of the 50 mL beaker minus the tare weight of the beaker. The residue weight was calculated as the difference between the dry weight of the sample minus the dry weight of the control. Finally, the extractables were calculated as the residue weight divided by the area of the sample in square feet, to yield a value in terms of grams per square feet (g/sq-ft).

The membranes of Example 1 (dried according to Example 5) and of Control A were examined for extractable material ("extractables"). The membrane of Control A had been dried by the manufacturer after treating the membrane with a glycerin as a wetting agent. Another conventional PVDF ultrafiltration membrane having a molecular weight cut-off of about 1,000,000 daltons was also examined for extractables. This "Control B" membrane was a FH membrane available from PTI ADVANCED FILTRATION, INC. that had been dried without any treatment with wetting agent.

The membrane of Example 1 had extractables of 0.0079 g/sq-ft. Analysis of this residue by FTIR spectroscopy indicated that the residue contained primarily HPC. The Control A membrane had extractables of 1.27g/sq-ft, and FTIR analysis indicated that the extractables contained primarily glycerin. The Control B membrane had extractables of 0.0050 g/sq-ft, and FTIR analysis indicated that the residue contained primarily PVP.

Filtration Properties For ~$10^6$ Dalton Cutoff Membranes

Samples of the membranes of Example 1 and of Control A were placed separately in test cells for cross-flow filtration. The hydrophilic membrane of Example 1 was installed dry, whereas the hydrophobic membrane of Control A was maintained in a hydrated state. The membranes were tested for the level of flux of clean water at 50 psi. An aqueous solution of dextran having a molecular weight of about 280,000 daltons was passed through each test cell, and the rejection of the dextran by each membrane was measured. The results of these tests are given in Table 1. The membranes had similar rejection for dextran; however, the hydrophilic membrane had a much higher clean water flux.

Samples of these two membranes were also analyzed for whey filtration using an OPTISEP 800 Filtration Unit (PTI ADVANCED FILTRATION, INC.). For comparative purposes, commercially available membranes made of PVDF and of polysulfone (PS) were also analyzed. A 10% solids mixture of a 35% whey protein concentrate was passed through each test cell, and the filtration properties were measured for each membrane. Protein analyses of the filtrate were performed by rTECH LABORATORIES (St. Paul, Minn.). The measured properties are shown in Table 1. For comparison to hydrophilic membranes of different molecular weight cut-offs, some filtration results are also listed in Table 2.

TABLE 1

| | Control A | Example 1 | PVDF | PS |
|---|---|---|---|---|
| Clean water flux (GFD @ 50 psi) | 3800 | 6000 | | |
| Rejection of ~280,000 dalton dextran (%) | 5 | 3 | | |
| ~2,000,000 dalton dextran-Blue rejection (%) | 73 | 69 | | |
| IgG rejection stirred cell (average %) | 11.05 | 7.04 | | |
| Rejection of fat in whey (%) | >99 | >98.5 | >99 | >99 |
| Consep whey flow rate (mL/2 min) | 70–80 | 83 | 55 | 73 |
| Passage of proteins (%) | | | | |
| Alpha lactalbumin | 0.29 | 0.31 | 0.26 | 0.29 |
| Beta lactoglobulin | 1.1 | 1.2 | 0.76 | 0.98 |
| IgG | 0.04 | 0.04 | <0.02 | 0.03 |
| BSA | 0.03 | 0.03 | 0.01 | 0.02 |

Oil-Water Separation for ~500,000 Dalton Cutoff Membranes

The filtration properties of the membrane of Example 2 were analyzed for an oil-water mixture and for an aqueous protein mixture. For comparative purposes, a conventional PVDF ultrafiltration membrane having a molecular weight cut-off of about 500,000 daltons was also analyzed. The conventional membrane was a FG membrane available from PTI ADVANCED FILTRATION, INC., and did not include a blend of PVDF with a hydroxyalkylcellulose. The conventional membrane is referred to as "Control C."

Samples of each of the membranes were cut into 43 mm disks, and each was placed in an AMICON stirred ultrafiltration cell (AMICON, INC., Beverly, Mass.). Deionized water (10 mL) was added to each cell, and the AMICON unit was turned on at a pressure of 5 psi. The water flux through the hydrophilic membrane of Example 2 was similar to the flux through the hydrophobic membrane of Control C. After the water had passed through the cells, 10 mL of an oil-water mixture was added to each cell. The oil-water mixture contained 55 mL olive oil and 500 mL deionized water, which had been mixed in a blender. The AMICON unit was again turned on at a pressure of 5 psi. The hydrophilic membrane of Example 2 had a flux for the oil-water miixture of 1.6 mL/min. The water passed through the membrane first, and then some of the oil also passed through. A thin layer of oil remained on the membrane surface. The hydrophobic membrane of Control C had a flux of 3.42 mL/min. For this membrane, only a small amount of oil remained on the membrane surface. More oil was passed through the membrane of Control C than the membrane of Example 2.

Filtration Properties For ~500,000 Dalton Cutoff Membrane

A fresh sample (43 mm disk) of the membrane of Example 2 was placed in an AMICON stirred ultrafiltration cell. A 2 mg/mL mixture of apoferritin in water (0.1 molar NaCl) was passed through the test cell at a pressure of 5 psi, and the filtration properties were measured. The average rejection of protein was 28%, and the average flux of filtrate was 513 GFD.

A fresh sample (43 mm disk) of the membrane of Example 2 was placed in an AMICON stirred ultrafiltration cell. A 2 mg/mL mixture of dextran (about 250,000 daltons) in water (0.1 molar NaCl) was passed through the test cell at a pressure of 5 psi, and the filtration properties were measured. The average rejection of the dextran was 32%, and the average flux of filtrate was 544 gallons per day (gal/day). These dextran filtration results are listed in Table 2.

Oil-Water Separation for ~100,000 Dalton Cutoff Membranes

The filtration properties of the membrane of Example 3 were analyzed for an oil-water mixture and for an aqueous protein mixture. For comparative purposes, a conventional PVDF ultrafiltration membrane having a molecular weight cut-off of about 100,000 daltons was also analyzed. The conventional membrane was an EP membrane available from PTI ADVANCED FILTRATION, INC., and did not include a blend of PVDF with a hydroxyalkylcellulose. The conventional membrane is referred to as "Control D."

Samples of each of the membranes were cut into 43 mm disks, and each was placed in an AMICON stirred ultrafiltration cell (AMICON, INC., Beverly, Mass.). Deionized water (10 mL) was added to each cell, and the AMICON unit was turned on at a pressure of 5 psi. The water flux through the hydrophilic membrane of Example 3 was similar to the flux through the hydrophobic membrane of Control D. After the water had passed through the cells, 10 mL of an oil-water mixture was added to each cell. The oil-water mixture contained 55 mL olive oil and 500 mL deionized water, which had been mixed in a blender. The AMICON unit was again turned on at a pressure of 5 psi. The hydrophilic membrane of Example 3 had a high flux for the oil-water mixture. The water passed through the membrane first, and then the oil also passed through. The hydrophobic membrane of Control D had a low flux. For this membrane, only the water from the mixture passed through, and the oil remained on the membrane surface.

Filtration Properties for ~100,000 Dalton Cutoff Membrane

A fresh sample (43 mm disk) of the membrane of Example 3 was placed in an AMICON stirred ultrafiltration cell. A 2 mg/mL mixture of apoferritin in water (0.1 molar NaCl) was passed through the test cell at a pressure of 5 psi, and the filtration properties were measured. The average rejection of protein was 82%, and the average flux of filtrate was 84 GFD.

A fresh sample (43 mm disk) of the membrane of Example 3 was placed in an AMICON stirred ultrafiltration cell. A 2 mg/mL mixture of apoferritin (about 450,000 daltons) in water (0.1 molar NaCl) was passed through the test cell at a pressure of 5 psi, and the filtration properties were measured. The average rejection of protein was 90%, and the average flux of filtrate was 75 gal/day. These apoferritin filtration results are listed in Table 2.

A fresh sample (43 mm disk) of the membrane of Example 3 was placed in an AMICON stirred ultrafiltration cell. A 2 mg/mL mixture of dextran (about 250,000 daltons) in water (0.1 molar NaCl) was passed through the test cell at a pressure of 5 psi, and the filtration properties were measured. The average rejection of protein was over 90%, and the average flux of filtrate was 200 gal/day. These dextran filtration results are listed in Table 2.

Filtration Properties for ~5,000 Dalton Cutoff Membrane

A sample (43 mm disk) of the membrane of Example 4 was placed in an AMICON stirred ultrafiltration cell. A 2 mg/mL mixture of dextran (about 5,000 daltons) in water (0.1 molar NaCI) was passed through the test cell at a pressure of 5 psi, and the filtration properties were measured. The average rejection of protein was 91%, and the average flux of filtrate was 15 gal/day. These dextran filtration results are listed in Table 2.

TABLE 2

| Ex. | Model (~daltons) | % Rejection | Filtration flux | Area-pressure |
|---|---|---|---|---|
| 1 | Whey fat | >99 | 35 cc/min | 0.01 m-4 psid |
| 2 | Dextran (250,000) | 32 | 544 gal/day | sq ft.-50 psid |
| 3 | Dextran (250,000) | >90 | 200 gal/day | sq ft.-50 psid |
|   | Apoferritin (450,000) | 90 | 75 gal/day | sq ft.-50 psid |
| 4 | Dextran (5,000) | 91 | 15 gal/day | sq ft.-50 psid |

It is therefore intended that the foregoing detailed description be regarded as illustrative rather than limiting, and that it be understood that it is the following claims, including all equivalents, that are intended to define the spirit and scope of this invention.

The invention claimed is:

1. A semipermeable membrane, comprising:
a porous polymeric structure comprising a homogeneous blend of PVDF and hydroxyalkylcellulose; wherein the membrane is hydrophilic.

2. The membrane of claim 1, wherein the hydroxyalkylcellulose is selected from the group consisting of hydroxymethylcellulose, hydroxyethylcellulose, hydroxypropylcellulose, hydroxybutylcellulose, hydroxypentylcellulose, and mixtures thereof.

3. The membrane of claim 1, wherein the hydroxyalkylcellulose comprises a mixed hydroxyalkylcellulose.

4. The membrane of claim 1, wherein the hydroxyalkylcellulose is selected from the group consisting of hydroxyethylcellulose, hydroxypropylcellulose, and mixtures thereof.

5. The membrane of claim 1, wherein the hydroxyalkylcellulose comprises hydroxyethylcellulose.

6. The membrane of claim 1, wherein the hydroxyalkylcellulose comprises hydroxypropylcellulose.

7. The membrane of claim 1, wherein the ratio of PVDF to hydroxyalkylcellulose in the porous polymeric structure is from about 20:1 to about 5:1.

8. The membrane of claim 1, wherein the ratio of PVDF to hydroxyalkylcellulose in the porous polymeric structure is from about 15:1 to about 7:1.

9. The membrane of claim 1, wherein the membrane is hydrophilic in the absence of a wetting agent.

10. The membrane of claim 1, wherein, when the membrane is dried, the membrane remains hydrophilic.

11. The membrane of claim 1, wherein the membrane is an ultrafiltration membrane.

12. The membrane of claim 11, wherein the membrane is in the form of a hollow fiber.

13. The membrane of claim 11, wherein the membrane is in the form of a flat sheet.

14. The membrane of claim 13, wherein one surface of the flat sheet is in contact with a porous inert substrate.

15. An ultrafiltration membrane, comprising:
a porous polymeric structure comprising a homogeneous blend of PVDF and hydroxyalkylcellulose in a ratio from about 20:1 to about 5:1; wherein the membrane is hydrophilic and has a molecular weight cut-off from about 1,000 daltons to about 2,000,000 daltons.

16. The ultrafiltration membrane of claim 15, wherein the membrane is hydrophilic in the absence of a wetting agent.

17. The ultrafiltration membrane of claim 15, wherein, when the membrane is dried, the membrane remains hydrophilic.

18. The ultrafiltration membrane of claim 15, wherein the membrane has a molecular weight cut-off from about 3,000 daltons to about 1,000,000 daltons.

19. The ultrafiltration membrane of claim 15, wherein the membrane has a molecular weight cut-off from about 10,000 daltons to about 500,000 daltons.

20. The ultrafiltration membrane of claim 15, wherein the hydroxyalkylcellulose is selected from the group consisting of hydroxymethylcellulose, hydroxyethylcellulose, hydroxypropylcellulose, hydroxybutylcellulose, hydroxypentylcellulose, and mixtures thereof.

21. The ultrafiltration membrane of claim 15, wherein the hydroxyalkylcellulose comprises hydroxyethylcellulose.

22. The ultrafiltration membrane of claim 15, wherein the hydroxyalkylcellulose comprises hydroxypropylcellulose.

23. The ultrafiltration membrane of claim 15, wherein the membrane is in the form of a hollow fiber.

24. The ultrafiltration membrane of claim 15, wherein the membrane is in the form of a flat sheet.

25. The ultrafiltration membrane of claim 24, wherein one surface of the flat sheet is in contact with a porous inert substrate.

26. A filter for ultrafiltration, comprising:
a semipermeable membrane comprising a homogeneous blend of a mixture of PVDF and hydroxyalkylcellulose and comprising a feed surface and a permeate surface; wherein the membrane is hydrophilic.

27. The filter of claim 26, wherein the membrane is in the form of a hollow fiber, and the feed surface is the outer surface of the fiber.

28. The filter of claim 26, wherein the membrane is in the form of a hollow fiber, and the feed surface is the inner surface of the fiber.

29. The filter of claim 26, wherein the membrane is in the form of a sheet.

30. The filter of claim 29, wherein the permeate surface of the membrane is in contact with a porous inert substrate.

31. The filter of claim 29, wherein the sheet is planar.

32. The filter of claim 29, wherein the sheet is pleated.

33. The filter of claim 29, wherein the sheet is spiral wound.

34. The filter of claim 33, further comprising a second semipermeable membrane comprising a blend of a mixture of PVDF and hydroxyalkylcellulose, wherein the second semipermeable membrane is hydrophilic.

35. The filter of claim 34, further comprising a feed fluid layer; wherein the permeate surface of each membrane is in contact with a separate porous inert substrate layer, and the membranes and the feed fluid layer are configured as an envelope having the feed fluid layer in the center of the envelope and having the porous inert substrate layers on the exterior of the envelope.

36. The filter of claim 35, further comprising a permeate transport layer; wherein the envelope is wound in a spiral, and the permeate transport layer is positioned between the porous inert substrate layers.

37. The filter of claim 26, wherein the filter is configured to flow unfiltered feed fluid across the feed surface of the membrane in a path that is tangential to the surface.

38. The filter of claim 26, wherein the membrane has a molecular weight cut-off from about 1,000 daltons to about 2,000,000 daltons.

39. An ultrafiltration membrane, comprising:
a porous polymeric sheet comprising a homogeneous blend of PVDF and hydroxyalkylcellulose in a ratio from about 20:1 to about 5:1, and comprising a feed surface and a permeate surface; wherein the hydroxyalkylcellulose is selected from the group consisting of hydroxyethylceltulose, hydroxypropylcellulose and mixtures thereof and a porous inert substrate in contact with the permeate surface; wherein the membrane is hydrophilic in the absence of a wetting agent, and remains hydrophilic when the membrane is dried.

* * * * *